(12) United States Patent
Chen et al.

(10) Patent No.: US 9,648,147 B2
(45) Date of Patent: May 9, 2017

(54) SYSTEM AND METHOD FOR TCP HIGH AVAILABILITY

(75) Inventors: Huaimo Chen, Bolton, MA (US); Steve Yao, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 564 days.

(21) Appl. No.: 11/963,717

(22) Filed: Dec. 21, 2007

(65) Prior Publication Data

US 2008/0159325 A1 Jul. 3, 2008

Related U.S. Application Data (60) Provisional application No. 60/882,650, filed on Dec. 29, 2006.

(51) Int. Cl.
*G06F 15/173* (2006.01)
*H04L 29/06* (2006.01)
*H04L 29/14* (2006.01)

(52) U.S. Cl.
CPC ........... *H04L 69/16* (2013.01); *H04L 69/163* (2013.01); *H04L 69/40* (2013.01)

(58) Field of Classification Search
CPC ........ H04L 69/16; H04L 69/163; H04L 69/40
USPC ........................................................ 709/239
See application file for complete search history.

(56) References Cited

U.S. PATENT DOCUMENTS

| | | | |
|---|---|---|---|
| 5,541,927 A * | 7/1996 | Kristol et al. | 370/408 |
| 6,182,139 B1 | 1/2001 | Brendel | |
| 6,247,059 B1 * | 6/2001 | Johnson et al. | 709/237 |
| 6,751,191 B1 * | 6/2004 | Kanekar et al. | 370/217 |
| 6,853,617 B2 | 2/2005 | Watson et al. | |
| 6,865,591 B1 | 3/2005 | Garg et al. | |
| 6,910,148 B1 * | 6/2005 | Ho et al. | 714/4.4 |
| 6,938,179 B2 | 8/2005 | Iyer et al. | |
| 7,061,858 B1 * | 6/2006 | Di Benedetto et al. | 370/219 |
| 7,116,634 B1 | 10/2006 | Hanselmann | |
| 7,515,525 B2 | 4/2009 | Appanna et al. | |
| 7,549,078 B2 | 6/2009 | Harvey et al. | |
| 7,562,363 B1 * | 7/2009 | Belair et al. | 718/102 |
| 7,609,617 B2 | 10/2009 | Appanna et al. | |
| 7,907,613 B1 * | 3/2011 | Chiabaut | H04L 1/1635 370/394 |

(Continued)

FOREIGN PATENT DOCUMENTS

| | | |
|---|---|---|
| CN | 1567919 A | 1/2005 |
| CN | 1832483 A | 9/2006 |

(Continued)

OTHER PUBLICATIONS

Frank Vahid, "The Softening of Hardware," Computer, vol. 36, No. 4, pp. 27-34, Apr. 2003, doi:10.1109/MC.2003.1193225.*

(Continued)

*Primary Examiner* — June Sison
(74) *Attorney, Agent, or Firm* — Slater Matsil, LLP (57) ABSTRACT

The present invention provides a system and method for TCP High Availability. The system concurrently delivers incoming data streams to AMB and SMB, concurrently sends outgoing data streams originated from AMB to SMB and peer routers, synchronizes the incoming and outgoing data streams between AMB and SMB, and accelerates the synchronizations of the incoming and outgoing data streams between AMB and SMB.

24 Claims, 6 Drawing Sheets

(56) References Cited

U.S. PATENT DOCUMENTS

| | | | |
|---|---|---|---|
| 8,051,326 | B2 | 11/2011 | Chen |
| 2002/0093981 | A1 | 7/2002 | Turina et al. |
| 2002/0107966 | A1 | 8/2002 | Baudot et al. |
| 2002/0176355 | A1* | 11/2002 | Mimms et al. ............... 370/216 |
| 2003/0161271 | A1* | 8/2003 | Ku et al. ....................... 370/241 |
| 2003/0218982 | A1* | 11/2003 | Folkes et al. ................. 370/238 |
| 2004/0042395 | A1* | 3/2004 | Lu et al. ....................... 370/225 |
| 2004/0153700 | A1 | 8/2004 | Nixon et al. |
| 2005/0213498 | A1 | 9/2005 | Appanna et al. |
| 2005/0289391 | A1 | 12/2005 | Ichikawa et al. |
| 2006/0062142 | A1 | 3/2006 | Appanna et al. |
| 2006/0159011 | A1 | 7/2006 | Dalal et al. |
| 2006/0233182 | A1 | 10/2006 | Appanna et al. |
| 2006/0262734 | A1 | 11/2006 | Appanna et al. |
| 2007/0064698 | A1 | 3/2007 | Appanna |
| 2007/0086461 | A1* | 4/2007 | Ward et al. ................... 370/392 |
| 2007/0180311 | A1 | 8/2007 | Harvey et al. |
| 2008/0016386 | A1 | 1/2008 | Dror et al. |
| 2008/0159325 | A1 | 7/2008 | Chen et al. |
| 2008/0163248 | A1 | 7/2008 | Chen |

FOREIGN PATENT DOCUMENTS

| | | |
|---|---|---|
| EP | 1331771 A1 | 7/2003 |
| WO | WO 2005048508 A2 | 5/2005 |

OTHER PUBLICATIONS

Steve McConnell, "Who Needs Software Engineering?," IEEE Software, vol. 18, No. 1, pp. 5-8, Jan./Feb. 2001, doi:10.1109/MS.2001.903148.*

Andrew Tanenbaum, Structured computer organization; (2nd ed.), Prentice-Hall, Inc., Upper Saddle River, NJ, 1984.*

[Prior Art] Ron White; "How Computers Work", Que Publishing (print date Oct. 2003), seventh edition,copyright pg, p. 9 & p. 16 & 17 (4 pages total), ISBN: 0-7897-3033-2.*

[Extrinsic Evidence] Wikipedia: Motherboard or Mainboard.*
[Extrinsic Evidence] Wikipedia: Multicast.*
[Extrinsic Evidence] Thesaurus.com: Synonyms: Concurrent.*
[Prior Art] RFC 793 "Transmission Control Protocol (TCP)" [updated by RFC 1122] (Sep. 1981) to Postel (editor).*
[Prior Art] RFC 1122 "Requirements for Internet Hosts—Communication Layers" (editor) [updates RFC 793] (Oct. 1989) to Braden.*
IEEE article A Reliable Multicast Framework for Light-weight Session and Application Level Framing (Dec. 1997) to Floyd et al. ("Floyd").*
www.CommsDesign.com (Jan. 2003) article "Build High availability into your IP Network Part 1" to Sheth. ("Sheth").*
Web dictionary yourdictionary.com: http://computer.yourdictionary.com/line-card: line card—technical definition.*
IBM webpage: Understanding sockets concepts: http://publib.boulder.ibm.com/infocenter/zos/v1r11/topic/com.ibm.zos.r11.hala001/f1a1d48004.htm.*
Webpage What is Cisco chassis, backplane, and line card?: http://ciscorouterswitch.over-blog.com/article-what-is-cisco-chassis-backplane-and-line-card-95760275.html (Dec. 30, 2011).*
PCT Search Report and PCT Written Opinion of Application No. PCT/CN2007/071383, date of mailing Apr. 24, 2008 , 9 pages total.
Andersson, L., et al., "LDP Specification," RFC 3036, The Internet Society, 132 pages, Jan. 2001.
Awduche, D., et al., "RSVP-TE: Extensions to RSVP for LSP Tunnels," RFC 3209, The Internet Society, 57 pages, Dec. 2001.
Rekhter, Y., et al., "A Border Gateway Protocol 4 (BGP-4)," RFC 1771, IETF, 54 pages, Mar. 1995.
Written Opinion of PCT/CN2007/071383, date of mailing Apr. 24, 2008, Applicant Huawei Technologies Co., Ltd., 3 pages.
European Search Report, Application No. PCT/CN2007071383, date of mailing Dec. 3, 2009, Applicant Huawei Technologies Co., Ltd., 11 pages.
First Chinese Office Action of Chinese Application No. 200780048786.2, dated Aug. 24, 2011, with partial translation, 10 pages.

* cited by examiner

SYSTEM AND METHOD FOR TCP HIGH AVAILABILITY

CROSS-REFERENCES TO RELATED APPLICATIONS

This application claims priority to U.S. Provisional Patent Application No. 60/882,653, filed on Dec. 29, 2006, commonly assigned, incorporated by reference herein for all purposes. This application is also related to U.S. patent application Ser. No. 11/872508, filed on Oct. 15, 2007, commonly assigned, and incorporated by reference herein for all purposes.

BACKGROUND OF THE INVENTION

The present invention relates generally to network communications, and more particularly, to the architecture and methods for Transmission Control Protocol (TCP) High Availability (HA).

TCP is a lower level connection protocol. It is used in a router by higher level routing protocols such as Border Gateway Protocol (BGP) for setting up connections with peer routers and exchanging route information with them. In a router with an Active Main Board (AMB) and a Standby Main Board (SMB), TCP and other protocols such as BGP and Label Distribution Protocol (LDP) run on AMB and SMB. TCP HA provides the support for the high availability of those protocols that use TCP. When AMB fails, SMB will take over the role as a new AMB smoothly if TCP and other protocols have the high availability capability.

The existing architecture and methods for Transmission Control Protocol (TCP) High Availability (HA) use a message flow-through or mirror based mechanism. For the high availability system using the message flow-through mechanism, it delivers incoming TCP data to SMB first and then transfers the data to AMB through an internal Inter-Process Communication (IPC). For outgoing TCP data originated from an application in AMB, the data is transferred to SMB first through the internal IPC and then delivered to their destinations through line cards.

Figure 1:
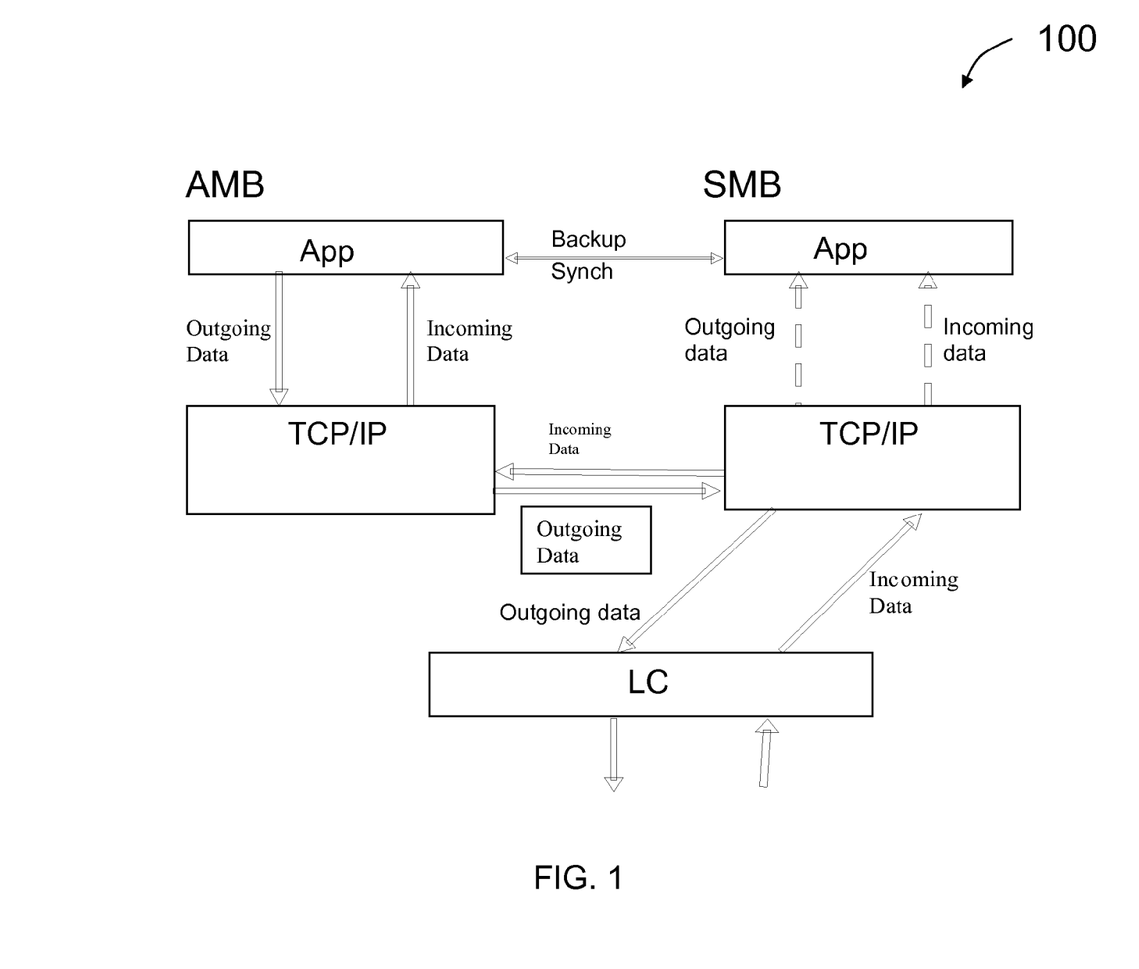
FIG. 1 depicts architecture of a flow-through based TCP HA.

During the normal operation of the conventional TCP HA, an incoming TCP data stream containing application or routing protocol messages from a peer router is transmitted through both AMB and SMB. It flows through SMB first and then flow through AMB. Thus SMB can read the incoming data stream, decode the messages in the stream and obtain the state changes before it reaches AMB. Similarly, an outgoing TCP data stream containing application or routing protocol messages is also transmitted through both AMB and SMB. It flows through AMB first and then flows through SMB to a peer router. SMB can read the outgoing data stream, decode the messages in the stream and infer the state changes before it reaches the peer router. In this way, AMB and SMB are synchronized. FIG. 1 shows the architecture of flow-through based TCP HA.

In addition, both AMB and SMB maintain replicated sets of output buffers for the outgoing TCP data stream. These buffers store the fragments of data that are transmitted to the peer router. If an acknowledgement for a transmitted fragment is received from the destination peer router, the fragment is deleted from the buffers in both AMB and SMB. If no acknowledgement is received for the fragment transmitted within a predetermined time period, the fragment is retransmitted.

There are a few of issues in the existing solutions of prior art. At first, the existing solutions are not reliable in the sense that the problems in SMB may have impacts on AMB. For example, crashes of SMB may affect AMB since the TCP data streams flowing through SMB are broken. In addition, the existing solutions consume lots of internal IPC bandwidth. This may lead to congestions inside the router. Moreover, every incoming and outgoing TCP data stream takes an extra hop to its destination. This extra hop is from AMB to SMB for an outgoing data stream and from SMB to AMB for an incoming data stream.

Therefore, there is a need of a system that provides a reliable, efficient and simple solution for TCP High Availability. There is a further need of a system for TCP High Availability that reduces consumption of IPC bandwidth.

BRIEF SUMMARY OF THE INVENTION

The present invention provides methods and mechanisms for concurrently delivering incoming data streams to AMB and SMB, concurrently sending outgoing data streams originated from AMB to SMB and peer routers, synchronizing the incoming and outgoing data streams between AMB and SMB, and accelerating the synchronizations of the incoming and outgoing data streams between AMB and SMB. In addition, the present invention provides options for an application using TCP to control whether outgoing data streams originated from an application in AMB are delivered to the corresponding application in SMB and to select the methods of synchronization for achieving higher performance.

According to a specific embodiment, the present invention provides a transmission control protocol (TCP) high availability (HA) communication system. The system includes a first main board or active main board. The first main board comprises a first processor, which has a first application component and a first transmission control protocol (TCP) component. The first application component is coupled to the first TCP component for receiving and sending data and messages. The system also includes a second main board or standby main board. The second main board comprises a second processor, which has a second application component and a second transmission control protocol (TCP) component. The second application component is coupled to the second TCP component for receiving data and messages. The first TCP component is also coupled to the second TCP component for receiving and sending data and messages. The system may also include a line card or interface card. In the system, the first TCP component and the second TCP component are configured to concurrently receive incoming data from a line card. Additionally, the first TCP component is configured to concurrently send outgoing data to the line card and to the second TCP component. In an embodiment, the first TCP component, the second TCP component, the first application component, and the second application component comprise software codes, respectively. In various embodiments, the system also includes components for synchronization of incoming and outgoing data.

In various embodiments, the invention provides methods for synchronization of incoming and outgoing data. In a specific embodiment, a method is provided for incoming data synchronization using explicit acknowledgement in a transmission control protocol (TCP) high availability (HA) communication system. Additionally, a method is provided for incoming data synchronization using implied acknowledgements. Another method is provided for outgoing data synchronization in sequential mode. Yet another method is provided for outgoing data synchronization in concurrent mode.

According to another embodiment, the invention provides a high availability communication system. According to an alternative embodiment, the present invention provides a communication system. The system includes a first processor, which has a first application component and a first protocol component. The first application component is coupled to the first protocol component for receiving and sending data and messages. The system also includes a second processor, which has a second application component and a second protocol component. The second application component is coupled to the second protocol component. In addition, the first protocol component is coupled to the second protocol component for sending and receiving data and messages. Moreover, the first protocol component and the second protocol component are configured to concurrently receive incoming data from a line card. The first protocol component is also configured to concurrently send outgoing data to the line card and to the second protocol component.

In a specific embodiment of the communication system, the first protocol component includes a first transmission control protocol (TCP) component and the second protocol component includes a second transmission control protocol (TCP) component. In an embodiment, TCP states and data are synchronized between the first processor and second processor through short acknowledgement and request messages.

In another specific embodiment of the communication system, the first protocol component includes a first User Datagram Protocol (UDP) component and the second protocol component includes a second User Datagram Protocol (UDP) component. In yet another embodiment, the first protocol component includes a first Internet Protocol (IP) component and the second protocol component includes a second Internet Protocol (IP) component. In the various embodiments, communication states and data are synchronized between the first processor and second processor. One of ordinary skill in the art can adopt the specific methods for synchronization in TCP HA provided herein for other protocols, such as UDP and IP, etc.

The present invention provides a reliable, efficient and simple solution for the TCP High Availability. It minimizes the impact of the problems in SMB on AMB. Its consumption of internal IPC bandwidth is much lower. Its performance is higher. In addition to TCP, this new method can be used for the high availability of other protocols such as User Datagram Protocol (UDP) and Internet Protocol (IP), etc.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention resolves the issues existing in the conventional technologies. At first, it significantly improves the reliability of TCP HA through minimizing the impacts of the problems in SMB on AMB and reducing the dependence of AMB on SMB. Furthermore, it substantially reduces the consumption of the IPC bandwidth through concurrently delivering incoming data streams to AMB and SMB and concurrently sending outgoing data streams originated from AMB to SMB and to peer routers via line cards by multicast or other mechanism. In addition, no extra hop is taken for any incoming data stream and outgoing data stream. An incoming data stream from a peer router is directly delivered to its destination AMB and SMB. An outgoing data stream originated from AMB is directly sent to its destination a peer router without flowing through SMB.

The present invention provides a more efficient solution for TCP HA. Firstly, in the present invention, incoming data streams from peer routers are concurrently delivered to and concurrently processed by AMB and SMB. Similarly for outgoing data streams originated from AMB, they are concurrently sent to SMB and peer routers via line cards. Secondly, the synchronization between AMB and SMB is speeded up through short request messages between AMB and SMB. Moreover, most of the load for TCP HA can be moved to SMB. Thus AMB can have higher performance and so can the whole system.

Depending upon the embodiment, the present invention includes various features, which may be used. These features include the following:
1. The method and mechanism to concurrently delivery the incoming data to AMB and SMB.
2. The method and mechanism to synchronize the incoming data between TCP in AMB and TCP in SMB through explicit acknowledgement messages.
3. The method and mechanism to speed up the synchronization of the incoming data between TCP in AMB and TCP in SMB through explicit request messages.
4. The method and mechanism to synchronize the incoming data between TCP in AMB and TCP in SMB through implied acknowledgement messages.
5. The method and mechanism to speed up the synchronization of the incoming data between TCP in AMB and TCP in SMB through decoding the implied acknowledgements from SMB and sending request messages to SMB.
6. The method and mechanism to concurrently send the outgoing data to TCP in SMB and line cards to peer routers.
7. The method and mechanism for synchronizing the outgoing data between TCP in AMB and TCP in SMB in sequential mode.
8. The method and mechanism for synchronizing the outgoing data between TCP in AMB and TCP in SMB in concurrent mode.
9. The mechanism to allow an application to control whether the outgoing and incoming data is sent to the corresponding application in SMB.
10. The mechanism to allow an application to select the methods of synchronization of incoming and outgoing data between TCP in AMB and TCP in SMB.

As shown, the above features may be in one or more of the embodiments to follow. These features are merely examples, which should not unduly limit the scope of the claims herein. One of ordinary skill in the art would recognize many variations, modifications, and alternatives.

Figure 2:
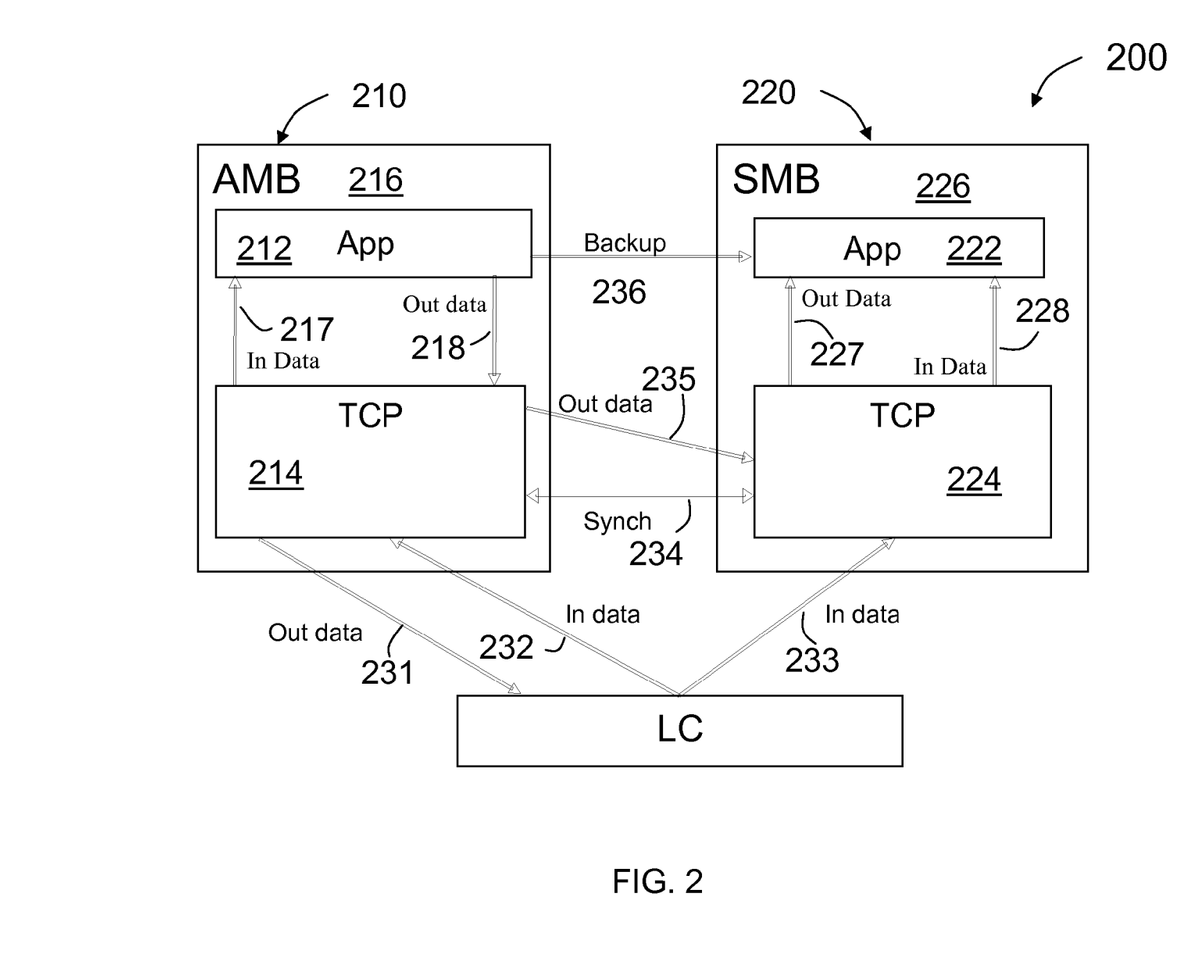
FIG. 2 depicts basic software architecture of multicast based TCP HA according to the present invention.

FIG. 2 is a simplified view diagram of a high availability communication system 200 according to an embodiment of the present invention. This diagram is merely an example, which should not unduly limit the scope of the claims herein. One of ordinary skill in the art would recognize other variations, modifications, and alternatives. As shown, communication system 200 includes a first main board or active main board 210 (AMB) and a second main board or standby main board 220 (SMB). The first main board comprises the first processor 216, which includes a first application component 212 (App) and a first protocol component 214. The second main board comprises the second processor 226, which includes a second application component 222 (App) and a second protocol component 224. In the specific embodiment of FIG. 2, both the protocol components 214 and 224 are transmission control protocol (TCP) components. In alternative embodiments, the protocol components can include other communication protocols.

In an embodiment, the first processor 216 can be an active processor and the second processor 226 can be a standby processor. As a specific example, system 200 can include two control processors in a router, one working as an active processor and the other as a backup processor. In a specific embodiment, communication system 200 also includes communication links coupling the various components. As shown in FIG. 2, the protocol component 214 and the application component 212 are coupled with links 217 and 218 for transferring data. Similarly, the protocol component 224 and the application component 222 are coupled with links 227 and 228 for transferring data. Further, the application component 212 in processor 210 and the application component 222 in processor 220 are coupled with link 236 for transferring data. Protocol components 214 and 224 are coupled with link 235 and link 234.

Additionally, communication system 200 exchanges data and messages with a system in a network, e.g. a peer router, through a line card 240. In a specific embodiment, line card 240 can be an interface component. In the example of FIG. 2, line card 240 communicates with systems 210 and 220 through links 231, 232, and 233 to transfer data.

In an embodiment, the first TCP component 214 and the second TCP component 224 are configured to concurrently receive incoming data from line card 240. The first TCP component 214 is also configured to concurrently send outgoing data to the line card 240 and to the second TCP component 224. In an example, multicast is used when the first TCP component 214 concurrently sends outgoing data to the line card 240 and to the second TCP component. Of course, other methods can also be used. The first processor 216 is also configured to send outgoing data to the second processor 226. In an embodiment, the second application component 222 in the second processor 226 listens to the incoming data or the outgoing data to update its states and data structures. In a specific embodiment, TCP states and data are synchronized between the active processor and standby processor through short acknowledgement and request messages.

Although the above has been shown using a selected group of components for improving reliability in a communication system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

Depending on the embodiment, the application components and the protocol components discussed above can be implemented in hardware, software, firmware, or a combination thereof According to a specific embodiment of the invention, the communication system 200 includes computer software code for implementing various functions and processes. For example, the first TCP component 214, the second TCP component 224, the first application component 212, and the second application component 222 can includes software codes for implementing their respective processes and operations. Examples of a software architecture and certain operation methods are discussed below with reference to FIGS. 2-6.

Basic Software Architecture

The basic software architecture of the present invention is illustrated in FIG. 2. Incoming TCP data is concurrently sent to the TCPs and then to the applications in the active main board (AMB) and the standby main board (SMB) from line cards using multicast or other mechanism. Outgoing TCP data originated from the applications such as BGP in AMB is concurrently sent to the line cards to the peer routers and the TCP in SMB through multicast or other mechanism. TCP or socket layer is enhanced to provide options that allow applications to choose whether outgoing TCP data is sent to the applications in SMB. The applications in SMB listen to the incoming TCP data or outgoing TCP data to update their states and data structures. TCP states and data are synchronized between AMB and SMB through short acknowledgement and request messages.

Incoming TCP Data Synchronizations

The present invention provides two methods for the synchronization of the incoming TCP data between AMB and SMB. One method uses explicit acknowledgements; the other uses implied acknowledgements.

Incoming TCP Data Synchronization Through Explicit Acknowledgements

Figure 3:
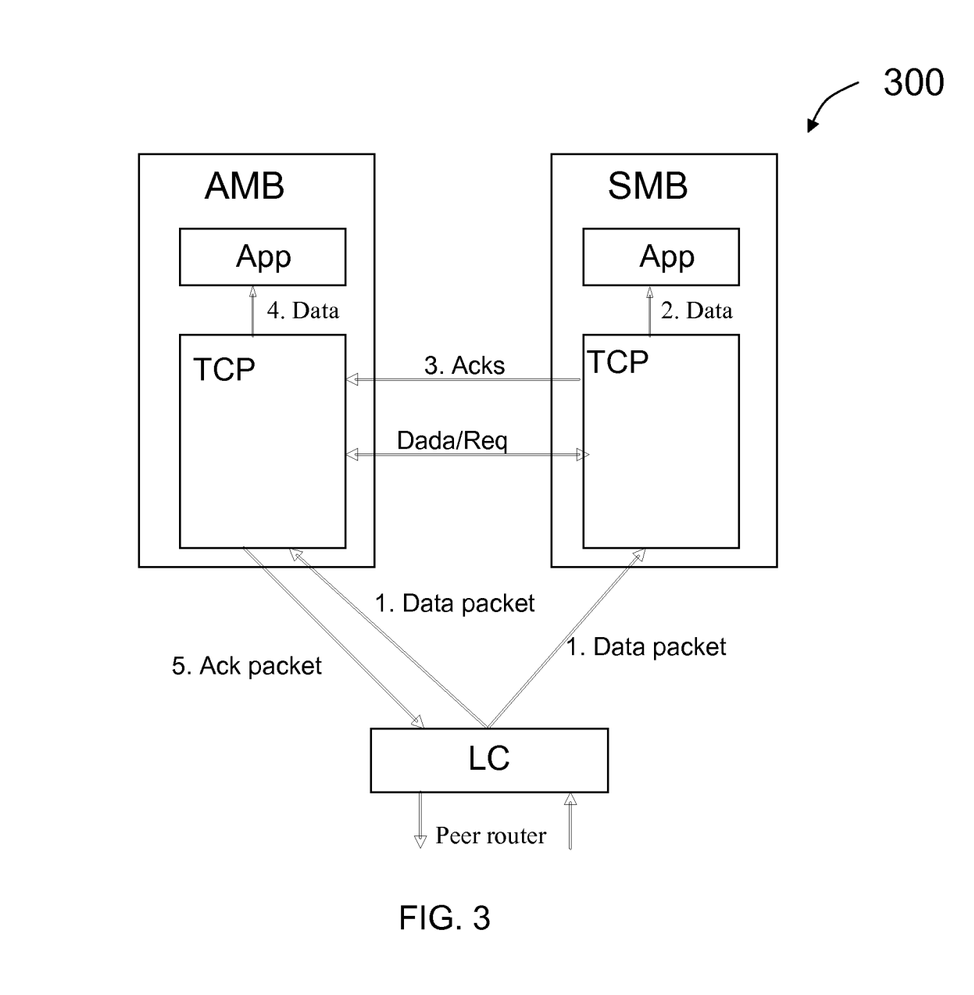
FIG. 3 depicts a diagram for incoming TCP data synchronization through explicit acknowledgements according to the present invention.

FIG. 3 illustrates the architecture of Incoming TCP data synchronization through explicit acknowledgements. The procedure of the incoming TCP data synchronization between AMB and SMB through explicit acknowledgements is as follows:

1. Incoming TCP data from a peer router is concurrently sent to TCPs in the active main board (AMB) and the standby main board (SMB) through multicast or other mechanism;
2. TCP in SMB delivers the data to the corresponding application in order as needed;
3. TCP in SMB sends the acknowledgement message for the data to the TCP in AMB after receiving the data from the peer router;
4. TCP in AMB delivers the data to the proper application after receiving the data and the acknowledgement message for the data from TCP in SMB; and
5. TCP in AMB sends the peer router an acknowledgement for the data it receives from the peer router after receiving the data and the acknowledgement message for the data from TCP in SMB.

In order to speed up the synchronization of the states and data of TCP in AMB and TCP in SMB, TCP in AMB sends the data packet to TCP in SMB after receiving the data packet for a given time without any acknowledgement message for the data from TCP in SMB;

TCP in AMB sends a request message to TCP in SMB after receiving the acknowledgement message for the data from TCP in SMB for a given time without receiving the data packet from the peer router; and TCP in SMB sends the data packet to TCP in AMB after receiving the request message for the data from TCP in AMB.

With the steps of speed up described above, the method should have even higher performance in general. In the case that TCP in SMB misses data packets from a peer router and TCP in AMB receives the data packets, TCP in AMB should send the data packets to TCP in SMB faster than the peer router. In the case that TCP in AMB misses data packets from a peer router and TCP in SMB receives the data packets, TCP in SMB should send the data packets to TCP in AMB faster than the peer router through receiving the request from TCP in AMB.

To avoid the impact of un-necessary requests and data on the performance in some special situations, the timers for sending data/request messages should be adjusted accordingly. They should be less than the TCP retransmission timer. They should be turned off when it is detected that most of the data/requests sent is not necessary or sending data/request messages does not speed up the incoming TCP data synchronization a lot. This can be done by recording the percentage of time saved for the data/requests sent between TCP in AMB and TCP in SMB.

Incoming TCP Data Synchronization Through Implied Acknowledgements.

Figure 4:
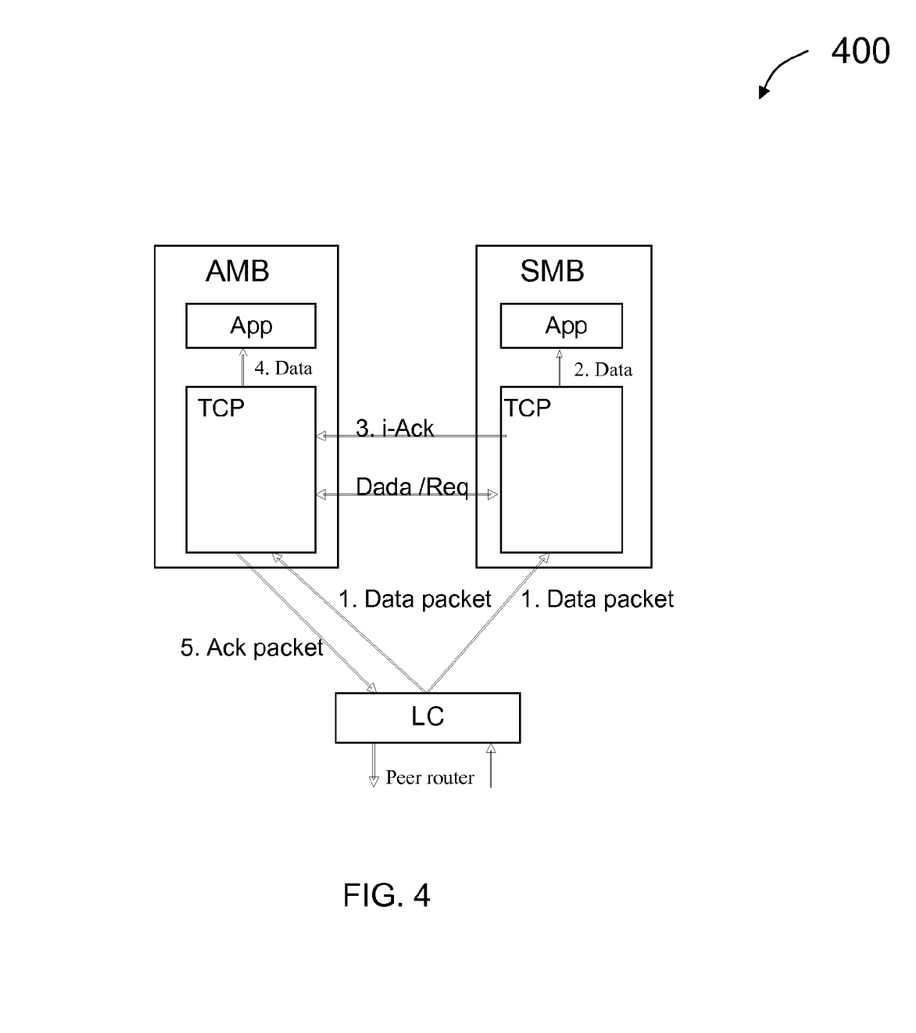
FIG. 4 depicts a diagram for incoming TCP data synchronization through implied acknowledgements according to the present invention.

FIG. 4 illustrates the architecture of incoming TCP data synchronization through implied acknowledgements. The procedure of the incoming TCP data synchronization between TCP in AMB and TCP in SMB through implied acknowledgements is as follows:

1. Incoming TCP data from peer routers is concurrently sent to TCP in AMB and TCP in SMB through a mechanism such as multicast;
2. TCP in SMB delivers the data to the corresponding application in order as needed;
3. TCP in SMB sends TCP in AMB an implied acknowledgement (i-Ack) message for the data. An implied acknowledgement or i-ack for short is a request message for the data when it finds that the data is missing (which implies that the data before this missing data has been received) or an empty request message when the amount of data received from the last request message sent is greater than a given size such as ½ of its window/buffer size or it does not send any request message for a given time. An empty request message contains the sequence number corresponding to the last byte received, which implies that all the data before this sequence number has been received;
4. TCP in AMB sends the application all the data that is acknowledged by TCP in SMB in its buffer in order; and
5. TCP in AMB sends the peer routers the acknowledgements for all the data that it received and that is acknowledged by TCP in SMB.

In order to speed up the synchronization of the states and data of TCP in AMB and TCP in SMB, TCP in AMB sends the data message to TCP in SMB after receiving an implied acknowledgement that is a non empty request message from TCP in SMB;

TCP in AMB sends a request message for the data to TCP in SMB after figuring out that the data is missing in AMB and TCP in SMB received the data; and TCP in SMB sends the data in a message to TCP in AMB after receiving the request message from AMB.

Outgoing TCP Data Synchronizations

The present invention provides two methods for the synchronization of the outgoing TCP data between AMB and SMB. The differences between these two methods are that one method works in a sequential mode and the other works in a concurrent mode.

Outgoing TCP Data Synchronization in Sequential Mode

Figure 5:
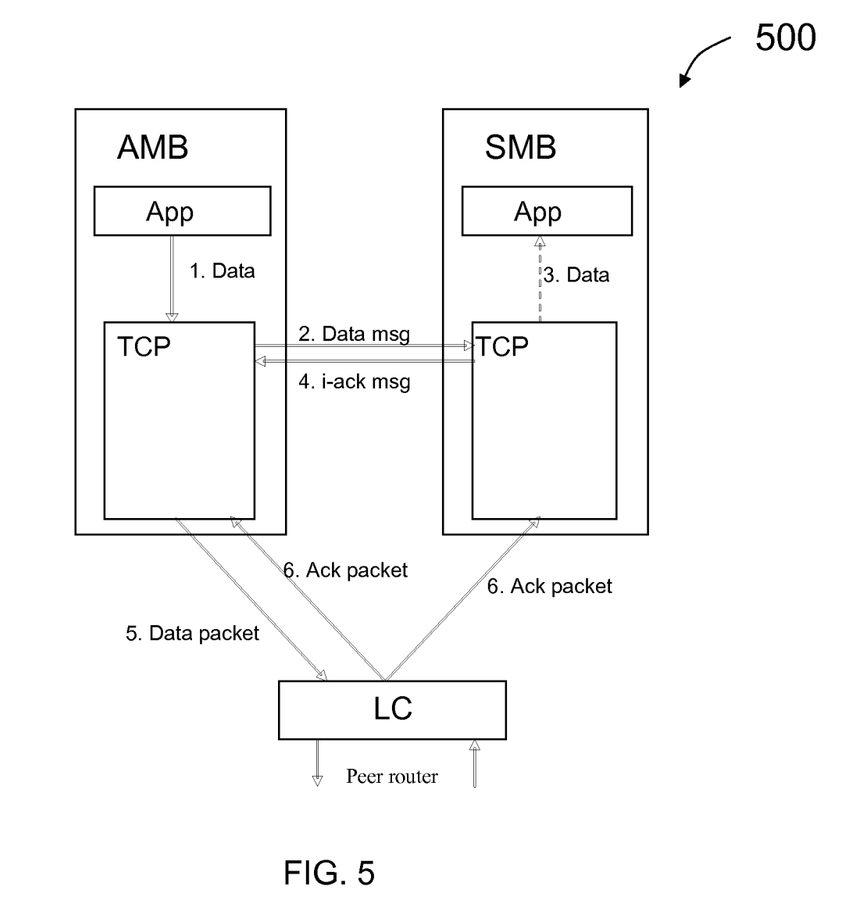
FIG. 5 depicts a diagram for outgoing TCP data synchronization in sequential mode according to the present invention.

FIG. 5 illustrates the architecture of outgoing TCP data synchronization between AMB and SMB in sequential mode. The procedure of the outgoing TCP data synchronization between TCP in AMB and TCP in SMB in sequential mode is as follows:

1. The data originated from an application in AMB is sent to TCP in AMB and TCP in AMB stores the data into its buffer in order;
2. The data is sent to TCP in SMB in a data message;
3. TCP in SMB stores the data in its buffer in order and sends the data to the corresponding application in SMB if it needs to listen to the outgoing data;
4. TCP in SMB sends TCP in AMB an implied acknowledgement (i-Ack) message for the data;
5. TCP in AMB sends the peer router the data that is acknowledged by the implied acknowledgement from TCP in SMB; and
6. TCP in AMB removes data from its window and buffer when receiving Acknowledgement for the data from peer routers and TCP in SMB removes data from its window and buffer when receiving Acknowledgement for the data from peer routers.

In order to speed up the synchronization of the states and data of TCP in AMB and TCP in SMB for an outgoing TCP data stream, TCP in SMB sends TCP in AMB an implied acknowledgement (i-Ack) for requesting the data when it finds that some data is missing; and TCP in AMB sends the data to TCP in SMB after receiving the request.

Outgoing TCP Data Synchronization in Concurrent Mode

Figure 6:
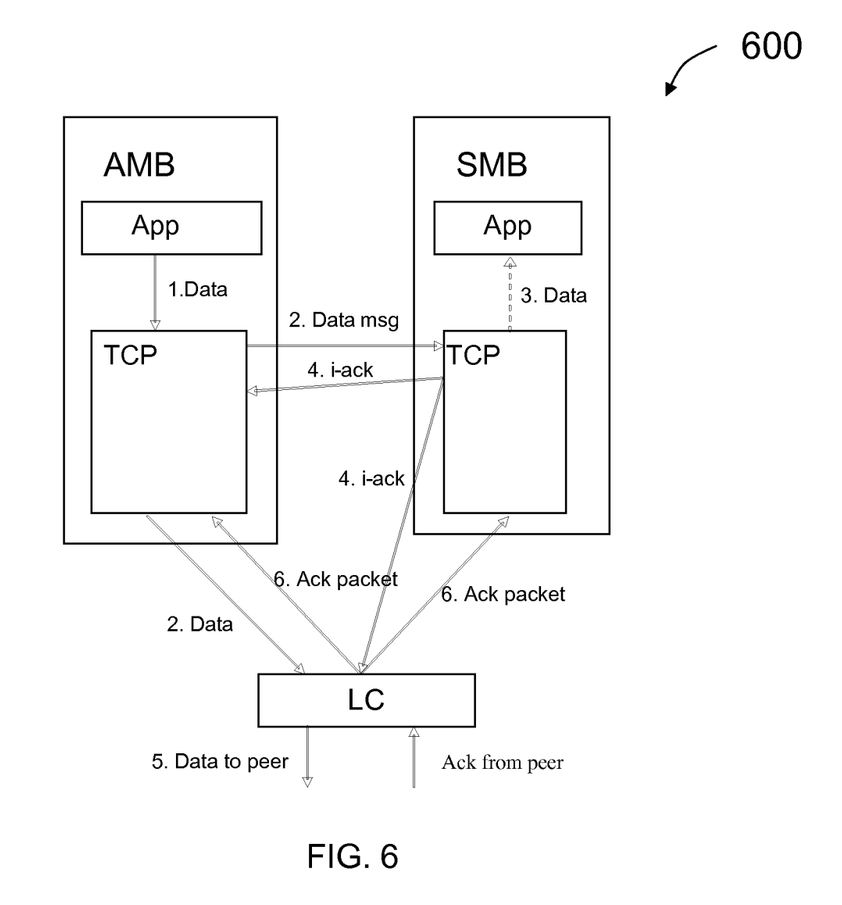
FIG. 6 depicts a diagram for outgoing TCP data synchronization in concurrent mode according to the present invention.

FIG. 6 illustrates the architecture of the outgoing TCP data synchronization between AMB and SMB in concurrent mode. The procedure of the outgoing TCP data synchronization between TCP in AMB and TCP in SMB in concurrent mode is as follows:

1. The data originated from an application in AMB is sent to TCP in AMB and TCP in AMB stores it into its buffer in order;
2. The data is concurrently sent to TCP in SMB and LC through a mechanism such as multicast;
3. TCP in SMB stores data in its buffer in order and sends the data to the corresponding application in SMB if it needs to read the outgoing data;
4. TCP in SMB concurrently sends TCP in AMB and LC an implied acknowledgement (i-Ack) for acknowledging the data;
5. LC sends the data to the peer router after receiving the implied acknowledgement (i-Ack) for acknowledging the data; and
6. TCP in AMB removes data from its window and buffer when receiving acknowledgement for the data from the peer router and TCP in SMB removes data from its window and buffer when receiving the acknowledgement for the data from the peer router.

In order to speed up the synchronization of the states and data among LC, TCP in AMB and TCP in SMB, TCP in SMB sends TCP in AMB an implied acknowledgement (i-Ack) for requesting the data when it finds that some data is missing;

TCP in AMB sends the data to SMB after receiving the request; and

TCP in AMB sends LC an implied acknowledgement (i-Ack) for acknowledging the data if it has received the implied acknowledgement (i-Ack) for the data from TCP in SMB but has not received any acknowledgement from the peer router for a given time. In this case, it also generates an alarm indicating that SMB may have some problems since the implied acknowledgement from SMB may not reach to LC.

Coordination Between Tcp And The Applications Using TCP With HA

TCP and the applications using TCP with High Availability coordinate in the different phases of the applications for their high availability. For an application in AMB to get protected by its corresponding application in SMB, it will go through a number of phases from the start of the corresponding application in SMB. The first phase is "batch backup". This phase starts from the time when the corresponding application in SMB starts to run and to back up the states and data from the application in AMB. It ends just before the second phase "real time backup". This phase starts from the time that the corresponding application in SMB starts to read the incoming or outgoing TCP data streams. It ends when a switchover happens.

During Batch Backup of an Application

During the phase of batch backup, the co-ordination among the application in AMB, the corresponding application in SMB, TCP in AMB and TCP in SMB is as follows:

The application in AMB backs up its TCP sockets to the corresponding application in SMB.

After a TCP socket is created by the corresponding application on SMB, the state and data structures of socket is synchronized in the TCP layer between AMB and SMB.

For incoming TCP data, the incoming data synchronization between TCP in AMB and TCP in SMB during this period is almost the same as those described before. The difference is that TCP in SMB does not deliver any incoming data to the application in SMB.

For outgoing TCP data, the outgoing data synchronization between TCP in AMB and TCP in SMB during this period is almost the same as those described before.

The difference is that TCP in SMB does not deliver any outgoing data to the application in SMB.

After Batch Backup and Before Real Time Backup

During the period after the batch backup and before the real time backup, the coordination among different components in AMB and SMB is described in two parts. One part is for incoming TCP data streams. The other is for outgoing TCP data streams.

For an incoming TCP data stream:

TCP in AMB holds off the data delivery to the application in AMB.

TCP in AMB sends TCP in SMB the sequence number m corresponding to the last byte of the data delivered to the application just before the holding off.

The application in AMB copies the data from its TCP input buffer to the corresponding application in SMB. The beginning of the data in the buffer should be the boundary of an application message.

The data in the input buffer of the application, the data in the input buffer of TCP in SMB and the incoming TCP data from the peer router will form the continuous incoming TCP data stream in SMB for the socket backed up from AMB.

For an Outgoing TCP Data Stream:

The application in AMB holds off the data delivery to TCP.

TCP in AMB sends TCP in SMB the sequence number n corresponding to the last byte of the data packet delivered to TCP by the application just before the holding off. The last byte should be the boundary of an application message.

After Real Time Backup Starts

When the real time backup starts, the co-ordination among different components in AMB and SMB is described in two parts. One part is for incoming TCP data streams. The other is for outgoing TCP data streams.

For an incoming TCP data stream:

TCP in SMB sends the incoming TCP data from the peer router from sequence number m+1 to the corresponding application in SMB as needed.

The application in SMB starts to read its incoming TCP data from the peer router as needed.

For an Outgoing TCP Data Stream:

TCP in SMB sends the outgoing TCP data originated from the application in AMB from sequence number n+1 to the corresponding application in SMB as needed.

The application in SMB starts to read the outgoing TCP data originated from the application in AMB as needed.

Switchover and Recovery

When a switchover happens, triggered by the problems such as crashes in AMB or enforced by user commands, the procedure of a switchover and recovery will be executed. The procedure includes the following:

Old SMB becomes new AMB

Applications using TCP in new AMB send data to peer routers through TCP

Applications in new AMB update Routing Table Manager (RTM)

Applications in new AMB receive and process interface events

For any peer session, re-create its session if its state is not final state (e.g., established for a BGP peer)

TCP in new AMB starts to send Acknowledgement packets to peer routers

TCP in new AMB accepts data from applications and sends data to peer routers

Some Extended TCP Socket Options

The extended TCP socket options allow an application to select or control some of the behaviors related to TCP HA such as whether incoming and outgoing data is delivered to the corresponding application in SMB. The options include:

Outgoing Data Delivery to Application—This option can be set by an application in AMB or SMB. When enabled, TCP in SMB sends the application in SMB the outgoing TCP data originated from the corresponding application in AMB.

Incoming Data Delivery to Application—This option can be set by an application in AMB or SMB. When enabled, TCP in SMB sends the application in SMB the incoming TCP data from a peer router.

Outgoing Data Synchronization Methods—An application can use this option to select one of the outgoing TCP data synchronization methods.

Incoming Data Synchronization Methods—An application can use this option to select one of the incoming TCP data synchronization methods.

According to a specific embodiment, the present invention provides a method for incoming data synchronization using explicit acknowledgement in a transmission control protocol (TCP) high availability (HA) communication system. The communication system includes a first processor and a second processor. The first processor has a first TCP component and a first application component, and the second processor has a second TCP component and a second application component. The method for incoming data synchronization includes the following processes:

1. concurrently receiving incoming data at the first TCP component in the first processor and the second TCP component in the second processor;
2. after the incoming data is received, transferring the incoming data from the second TCP component to the second application component in the second processor as needed;
3. after the incoming data is received, sending an acknowledgement message for the data from the second TCP component to the first TCP component;
4. transferring the incoming data from the first TCP component to the first application component after the first TCP component has received the data and the acknowledgement message from the second TCP component; and
5. sending an acknowledgement packet from the first TCP component to the line card, whereby the acknowledgement packet is delivered to a peer router.

For example, the method is implemented according to FIGS. 2 and 3.

In a specific embodiment for synchronization of incoming data using explicit request messages, a method for speeding up the synchronization includes the following processes:

after receiving the incoming data, the first TCP component sending the received incoming data to the second TCP component if an acknowledgement message is not received from the second TCP in a first predetermined length of time;

after receiving the acknowledgement message for incoming data from the second TCP, the first TCP sending a request message for the data to the second TCP if the incoming data is not received in a second predetermined length of time; and after receiving the request message for the data from the first TCP, the second TCP sending the incoming data to the first TCP.

According to another embodiment of the invention, a method is provided for incoming data synchronization using implied acknowledgements in a transmission control protocol high availability (TCP HA) communication system. The communication system includes a first processor and a second processor. The first processor has a first TCP component and a first application component, and the second processor has a second TCP component and a second application component. The method for incoming data synchronization includes the following processes:

1. concurrently receiving incoming data at the first TCP component in the first processor and the second TCP component in the second processor;
2. the second TCP component providing the data to the second application component as needed;
3. the second TCP component sending an implicit acknowledgement message to the first TCP component;
4. the first TCP component sending to the first application component the data that is acknowledged by the second TCP component in its buffer in order;
5. sending an acknowledgement, from the first TCP component to the line card, for data received at the first TCP component that is acknowledged by the second TCP component, whereby the acknowledgement is delivered to a peer router.

For example, the method is implemented according to FIGS. 2 and 4.

In a specific embodiment of the method for incoming data synchronization using implied acknowledgements, the implicit acknowledgement message can take different forms. As an example, the implicit acknowledgement message can be a request for the data when expected data is missing. This request implies that the data before this missing data has been received. In another example, the implicit acknowledgement message can also be an empty request message when the amount of data sent to the application from a last request message sent to the first TCP component is greater than a given size, such as ½ of a window/buffer size, the empty request message includes a sequence number corresponding to the last byte sent to the second application component. This empty request implies that all the data before this sequence number has been received. In yet another example, an implicit acknowledgement message can be an empty request message with a sequence number corresponding to the last byte sent to the second application if no request message is sent to the first TCP component for a given time.

In another specific embodiment of the method for incoming data synchronization using implied acknowledgements, the following processes are used to speed up the synchronization of the incoming data:

the first TCP component sending a data message to the second TCP component after receiving an implied acknowledgement that is a non empty request message from the second TCP component;

the first TCP component sending a request message for the data to the second TCP component after determining that data is missing in the first TCP component and the second TCP component has received the data; and the second TCP component sending the data in a message to the first TCP component after receiving the request message from the first TCP component.

In yet another embodiment, the invention provides a method for outgoing data synchronization in sequential mode in a transmission control protocol high availability (TCP HA) communication system. The communication system includes a first processor and a second processor. The first processor has a first TCP component and a first application component, and the second processor has a second TCP component and a second application component. The method for outgoing data synchronization includes the following processes:

1. sending data from the first application component to the first TCP component and storing the data into a buffer in the first TCP component;
2. sending the data to the second TCP component in a data message;
3. storing the data in a buffer in the second TCP component, and sending the data to the second application component in the second processor if the second application needs to listen to outgoing data;
4. the second TCP component sending an implicit acknowledgement message to the first TCP component;
5. the first TCP component sending to a peer router the data that is acknowledged by an implied acknowledgement message from the second TCP component; and
6. the first TCP component removing the data from its window and buffer when receiving an acknowledgement for the data from a peer router and the second TCP component removing data from its window and buffer when receiving an acknowledgement for the data from the peer router.

For example, the method is implemented according to FIGS. 2 and 5.

In another specific embodiment of the method for outgoing data synchronization in sequential mode in a TCP HA communication system, the following processes are used to speed up the synchronization of the outgoing data:
the second TCP component sending the first TCP component an implied acknowledgement (i-Ack) for requesting the data when it finds that some data is missing; and
the first TCP component sending the data to the second TCP component after receiving the request.

In yet another embodiment, the invention provides a method for outgoing TCP data synchronization in concurrent mode in a transmission control protocol high availability (TCP HA) communication system. The communication system includes a first processor and a second processor. The first processor has a first TCP component and a first application component, and the second processor has a second TCP component and a second application component. The method for outgoing data synchronization includes the following processes:

1. sending data from the first application component to the first TCP component and storing the data in a buffer in the first TCP component;
2. sending the data concurrently to the second TCP component and the line card;
3. storing the data in a buffer in the second TCP component in the second processor, and sending the data to the second application component in the second processor if the second application needs to listen to outgoing data;
4. the second TCP component concurrently sending to the first TCP component and the line card an implied acknowledgement message;
5. the line card sending the data to the peer router after receiving the implied acknowledgement for acknowledging the data; and
6. the first TCP component removing the data from its window and buffer when receiving acknowledgement for the data from the peer router and the second TCP component removing the data from its window and buffer when receiving the acknowledgement for the data from the peer router.

For example, the method is implemented according to FIGS. 2 and 6.

In another specific embodiment of the method for outgoing data synchronization in concurrent mode in a TCP HA communication system, the following processes are used to speed up the synchronization of the outgoing data:
the second TCP component sending the first TCP component an implied acknowledgement (i-Ack) for requesting the data when it finds that some data is missing;
the first TCP component sending the data to the second TCP component after receiving the request; and
the first TCP component sending the line card an implied acknowledgement (i-Ack) for acknowledging the data if it has received the implied acknowledgement (i-Ack) for the data from the second TCP component but has not received any acknowledgement from the peer router for a given time. In this case, it also generates an alarm indicating that there may be some problems in the second processor since the implied acknowledgement from the second processor may not reach to the line card.

According to an alternative embodiment, the present invention provides a communication system. The system includes a first processor, which has a first application component and a first protocol component. The first application component is coupled to the first protocol component for receiving and sending data and messages. The system also includes second processor, which has a second application component and a second protocol component. The second application component is coupled to the second protocol component. In addition, the first protocol component is coupled to the second protocol component for sending and receiving data and messages. Moreover, the first protocol component and the second protocol component are configured to concurrently receive incoming data from a line card. The first protocol component is also configured to concurrently send outgoing data to the interface and to the second protocol component.

In a specific embodiment of the communication system, the first protocol component includes a first transmission control protocol (TCP) component and the second protocol component includes a second transmission control protocol (TCP) component. In an embodiment, TCP states and data are synchronized between the first processor and second processor through short acknowledgement and request messages. For example, the system is implemented in FIGS. 2-6.

In another specific embodiment of the communication system, the first protocol component includes a first User Datagram Protocol (UDP) component and the second protocol component includes a second User Datagram Protocol (UDP) component. In yet another embodiment, the first protocol component includes a first Internet Protocol (IP) component and the second protocol component includes a second Internet Protocol (IP) component. In the various embodiments, communication states and data are synchronized between the first processor and second processor. One of ordinary skill in the art can adopt the specific methods for synchronization in TCP HA provided herein for other protocols, such as UDP and IP, etc.

In a specific embodiment of the invention, a transmission control protocol (TCP) high availability (HA) communication system is provided. The system includes a first processor, which has a first application component and a first transmission control protocol (TCP) component. The first application component is coupled to the first TCP component for receiving and sending data and messages. The system also includes a second processor, which including a second application component and a second transmission control protocol (TCP) component. The second application component is coupled to the second TCP component for receiving data, the first TCP component being coupled to the second TCP component for receiving and sending data and messages. In the system, the first TCP component and the second TCP component are configured to concurrently receive incoming data from a line card. Additionally, the first TCP component is also configured to concurrently send outgoing data to the line card and to the second TCP component.

The Effects of the Invention

The effect of this invention is a significant improvement of reliability, scalability and performance for TCP HA. At first, it significantly improves the reliability of TCP HA through minimizing the impacts of the problems in SMB on AMB and reducing the dependence of AMB on SMB. Furthermore, it substantially reduces the consumption of the IPC bandwidth through concurrently delivering incoming data streams to AMB and SMB and concurrently sending outgoing data streams originated from AMB to SMB and line cards to peer routers by multicast or other mechanism. This will greatly improve the scalability and performance for TCP HA. In addition, no extra hop is taken for any incoming data stream and outgoing data stream. An incoming data stream from a peer router is directly delivered to its destination AMB and SMB. An outgoing data stream originated from AMB is directly sent to its destination a peer router without flowing through SMB.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A transmission control protocol (TCP) high availability (HA) communication system, the system comprising:
a first main board acting as an active main board, the first main board comprising a first processor, the first processor including a first application component and a first transmission control protocol (TCP) component, the first application component being coupled to the first TCP component for receiving and sending data; and
a second main board acting as a standby main board, the second main board comprising a second processor, the second processor including a second application component and a second transmission control protocol (TCP) component, the second application component being coupled to the second protocol component for receiving data, the first TCP component being coupled to the second TCP component for receiving and sending data and messages;
the first main board and the second main board being configured to concurrently receive incoming data from a line card and the first main board and the second main board are configured to synchronize the concurrently received incoming data, wherein the concurrently received incoming data are synchronized between the first main board and the second main board through acknowledgement and request messages, and wherein a process for synchronizing the concurrently received incoming data from the line card is speeded up by exchanging the received incoming data between the first main board and the second main board directly, and wherein a data exchange between the first main board and the second main board is faster than a data exchange between the line card and one of the first main board and the second main board, and wherein the data exchange between the first main board and the second main board is controlled by a first timer and the data exchange between the line card and one of the first main board and the second main board is controlled by a second timer, and wherein a time interval of the second timer is longer than that of the first timer; and
the first main board being configured to send outgoing data concurrently to the line card and to the second main board.

2. The system of claim 1 wherein the first TCP component, the second TCP component, the first application component, and the second application component each comprise software code.

3. The system of claim 1 wherein the first TCP component is configured to send outgoing data concurrently to the line card and to the second TCP component using a mechanism.

4. The system of claim 1 wherein the line card is configured to send outgoing data to a peer router.

5. The system of claim 1 wherein the second application component in the second processor listens to the incoming data or the outgoing data to update its states and data structures.

6. The system of claim 1 wherein TCP states and data are synchronized between the first processor and the second processor through short acknowledgement and request messages.

7. The system of claim 1 further comprising a component for incoming data synchronization using explicit acknowledgements, the component including computer program code for:
concurrently receiving incoming data at the first TCP component in the first processor and the second TCP component in the second processor;
after the incoming data is received, transferring the incoming data from the second TCP component to the second application component in the second processor;
after the incoming data is received, sending an acknowledgement message for the data from the second TCP component to the first TCP component;
transferring the incoming data from the first TCP component to the first application component after the first TCP component has received the data from a peer router and the acknowledgement message from the second TCP component; and
sending an acknowledgement packet from the first TCP component to the line card, wherein the acknowledgement packet is delivered to the peer router.

8. The system of claim 7 further comprising a component for speeding up synchronization of the incoming data using explicit acknowledgements, the component including computer program code for:
after receiving the incoming data, the first TCP component sending the received incoming data to the second TCP component if an acknowledgement message is not received from the second TCP in a first predetermined length of time;

after receiving the incoming data, the first TCP component not sending the received incoming data to the second TCP component if an acknowledgement message is received from the second TCP in a first predetermined length of time;

after receiving the acknowledgement message for incoming data from the second TCP, the first TCP sending a request message for the data to the second TCP if the incoming data is not received in a second predetermined length of time;

after receiving the acknowledgement message for incoming data from the second TCP, the first TCP not sending a request message for the data to the second TCP if the incoming data is received in a second predetermined length of time; and after receiving the request message for the data from the first TCP, the second TCP sending the incoming data to the first TCP, wherein sending data/request messages between the first TCP and the second TCP is controlled by a timer, and wherein a time length of the timer is less than a time length of a TCP retransmission timer.

9. The system of claim 1 further comprising a component for incoming data synchronization using implied implicit acknowledgements, the component including computer program code for:

concurrently receiving incoming data at the first TCP component in the first processor and the second TCP component in the second processor;

the second TCP component providing the data to the second application component;

the second TCP component sending an implicit acknowledgement message for the incoming data to the first TCP component;

the first TCP component sending to the first application component the data that is acknowledged by the second TCP component; and sending an acknowledgement, from the first TCP component to the line card, for the data received at the first TCP component that is acknowledged by the second TCP component, wherein the acknowledgement is delivered to a peer router.

10. The system of claim 9 wherein the implicit acknowledgement message comprises one of the following:

a request for the data message when expected data is missing; or an empty request message when the amount of data not acknowledged from a last request message sent to the first TCP component is greater than a given size, the empty request message including a sequence number corresponding to the last byte acknowledged to the first TCP component; or an empty request message when no request message being sent to the first TCP component for a given time, the empty request message including a sequence number corresponding to the last byte acknowledged.

11. The system of claim 9 further comprising a component for speeding up synchronization of incoming data using an implicit acknowledgement message, the component including computer program code for:

the first TCP component sending a data message to the second TCP component after receiving an implicit acknowledgement that is a non empty request message from the second TCP component;

the first TCP component sending a request message for the data to the second TCP component after determining that the data is missing in the first TCP component and the second TCP component has received the data; and the second TCP component sending the data in a message to the first TCP component after receiving the request message from the first TCP component.

12. The system of claim 1 further comprising a component for outgoing TCP data synchronization in sequential mode, the component including computer program code for:

sending data from the first application component to the first TCP component and storing the data into a buffer in the first TCP component;

sending the data to the second TCP component;

storing the data in a buffer in the second TCP component;

sending the data to the second application component in the second processor when the second application needs to listen to outgoing data;

the second TCP component sending an implicit acknowledgement message for the data received to the first TCP component;

the first TCP component sending to a peer router the data that is acknowledged by the implicit acknowledgement message from the second TCP component; and the first TCP component removing the data from its window and buffer when receiving an acknowledgement for the data from the peer router and the second TCP component removing the data from its window and buffer when receiving an acknowledgement for the data from the peer router.

13. The system of claim 12 further comprising a component for speeding up synchronization of outgoing data in sequential mode, the component including computer program code for:

the second TCP component sending the first TCP component an implicit acknowledgement (i-Ack) for requesting the data when it finds that some data is missing; and the first TCP component sending the data to the second TCP component after receiving the request.

14. The system of claim 1 further comprising a component for outgoing TCP data synchronization in concurrent mode, the component including computer program code for:

sending data from the first application component to the first TCP component and storing the data in a buffer in the first TCP component;

sending the data concurrently from the first TCP component to the second TCP component and the line card;

sending the data from the second TCP component to the second application component in the second processor when the second application needs to listen to outgoing data;

the second TCP component concurrently sending to the first TCP component and the line card an implicit acknowledgement message for the data received;

the line card sending the data to a peer router after receiving the implicit acknowledgement; and the first TCP component removing the data from its window and buffer when receiving an acknowledgement for the data from the peer router and the second TCP component removing the data from its window and buffer when receiving the acknowledgement for the data from the peer router.

15. The system of claim 14 further comprising a component for speeding up synchronization of outgoing data in concurrent mode, the component including computer program code for:

the second TCP component sending the first TCP component an implicit acknowledgement for requesting the data when it finds that some data is missing;

the first TCP component sending the data to the second TCP component after receiving the request; and the first TCP component sending the line card an implicit acknowledgement for acknowledging the data when it has received the implicit acknowledgement for the data from the second TCP component but has not received any acknowledgement from the peer router for a given time.

16. The system of claim 1 further comprising a component for allowing the first application component or the second application component to set an option for the second TCP component to send to the second application component outgoing data or incoming data.

17. The system of claim 1 further comprising a component for allowing the first application component or the second application component to select a synchronization method for incoming and outgoing data between the first TCP component and the second TCP component.

18. A communication system, the system comprising:

a first processor on an active main board, the first processor including a first application component and a first protocol component, the first application component being coupled to the first protocol component for receiving and sending data; and a second processor on a standby main board, the second processor including a second application component and a second protocol component, the second application component being coupled to the second protocol component, the first protocol component being coupled to the second protocol component for sending and receiving data and messages;

the first protocol component and the second protocol component being configured to concurrently receive incoming data from a line card and the first main board and the second main board are configured to synchronize the concurrently received incoming data, wherein the concurrently received incoming data are synchronized between the active main board and the standby main board through acknowledgement and request messages, and wherein a process for synchronizing the concurrently received incoming data from the line card is speeded up by exchanging the received incoming data between the active main board and the standby main board directly, and wherein a data exchange between the active main board and the standby main board is faster than a data exchange between the line card and one of the active main board and the standby main board, and wherein the data exchange between the active main board and the standby main board is controlled by a first timer and the data exchange between the line card and one of the active main board and the standby main board is controlled by a second timer, and wherein a time interval of the second timer is longer than that of the first timer; and the first protocol component being configured to send outgoing data concurrently to the line card and to the second protocol component.

19. The system of claim 18 wherein the first protocol component comprises a first transmission control protocol (TCP) component and the second protocol component comprises a second transmission control protocol (TCP) component.

20. The system of claim 19 wherein TCP states and data are synchronized between the first processor and second processor through short acknowledgement and request messages.

21. The system of claim 18 wherein the first protocol component comprises a first User Datagram Protocol (UDP) component and the second protocol component comprises a second User Datagram Protocol (UDP) component.

22. The system of claim 18 wherein the first protocol component comprises a first Internet Protocol (IP) component and the second protocol component comprises a second Internet Protocol (IP) component.

23. The system of claim 14 wherein the component includes further computer code for causing the first TCP component to generate an alarm indicating a potential problem in the second processor.

24. The system of claim 3 wherein the first TCP component is configured to send outgoing data concurrently to the line card and to the second TCP component using multicast.

* * * * *